Oct. 20, 1959

D. C. ROCKOLA 2,909,761

SELECTIVELY OPERABLE CONTROL MECHANISM FOR AUTOMATIC PHONOGRAPHS

Filed Nov. 16, 1953

6 Sheets-Sheet 1

INVENTOR.
David C. Rockola
BY Sheridan, Davis & Cargill
Att'ys

Oct. 20, 1959 D. C. ROCKOLA 2,909,761

SELECTIVELY OPERABLE CONTROL MECHANISM FOR AUTOMATIC PHONOGRAPHS

Filed Nov. 16, 1953 6 Sheets-Sheet 2

INVENTOR.
David C. Rockola
BY
Sheridan, Davis & Cargill
Att'ys

Oct. 20, 1959 D. C. ROCKOLA 2,909,761

SELECTIVELY OPERABLE CONTROL MECHANISM FOR AUTOMATIC PHONOGRAPHS

Filed Nov. 16, 1953 6 Sheets-Sheet 3

INVENTOR.
David C. Rockola
BY Sheridan, Davis & Cargill
Att'ys

INVENTOR.
David C. Rockola
BY
Sheridan, Davis & Cargill
Attys

Oct. 20, 1959 D. C. ROCKOLA 2,909,761

SELECTIVELY OPERABLE CONTROL MECHANISM FOR AUTOMATIC PHONOGRAPHS

Filed Nov. 16, 1953 6 Sheets-Sheet 5

INVENTOR.
David C. Rockola
BY Sheridan, Davis and Cargill
Att'ys

Oct. 20, 1959 D. C. ROCKOLA 2,909,761

SELECTIVELY OPERABLE CONTROL MECHANISM FOR AUTOMATIC PHONOGRAPHS

Filed Nov. 16, 1953 6 Sheets-Sheet 6

INVENTOR.
David C. Rockola
BY
Sheridan, Davis and Cargill
Att'ys

United States Patent Office 2,909,761

Patented Oct. 20, 1959

2,909,761

SELECTIVELY OPERABLE CONTROL MECHANISM FOR AUTOMATIC PHONOGRAPHS

David C. Rockola, Chicago, Ill., assignor to Rock-Ola Manufacturing Corporation, Chicago, Ill., a corporation of Illinois Application November 16, 1953, Serial No. 392,265

12 Claims. (Cl. 340—162)

This invention relates in general to automatic coin-controlled phonographs, and more particularly to selectively operable control mechanism therefor.

A principal object of the invention is to simplify the task of making a selection and reduce the probability of selection errors by the provision of mechanism which will enable an operator to effect any one of a large number of possible operations, such as the playing of any one of a large number of available phonograph recordings, after the proper coin or coins have been deposited, by operating a single push button from a group of buttons in number substantially less than that of the total possible operations.

Another object is to provide a plurality of groups of indices of available selections in superposed and edge-pivoted or book-like form with each group comprising a page or two opposed pages of indices of a number of selections, so that an operator may leaf through such pages in a natural fashion similar to leafing through a bound book; and to dispose the same number of selector push buttons or manually operable control members as there are indices in each group in marginally adjacent alignment with the individual indices of such groups or pages, with control means automatically operable by the means supporting the pages for such leafing action to effect group selections or selection of that group of indices thereby exposed to view, whereby operation of any push button will effect an operation of the mechanism thereby controlled corresponding to or identified by the exposed index marginally aligned therewith. Thus each actuation of each push button may effect any one of a plurality of different operations equal in number to the number of such groups provided, but the particular operation effected will be that identified by the exposed index marginally aligned therewith. Thus each actuation of each push button may effect any one of a plurality of different operations equal in number to the number of such groups provided, but the particular operation effected will be that identified by the exposed index associated with the operated button.

More specifically, in the embodiment of the invention herein disclosed, these objects are attained by providing two parallel rows of manually operable selector buttons, with ten buttons in each row, disposed at opposite sides of two adjacent stationary pages of ten identifying indices each, whereby each index has one of those selector buttons marginally associated and visually aligned therewith; and pivotally mounting an edge of each of two leaf members adjacent the intersection or dividing line between the stationary pages so that those leaves may be swung into superposed relation with either of the stationary pages. Each leaf mounts ten indices on each side arranged similarly to those on the stationary pages, resulting in four movable pages of ten indices each, so that three different groups of two pages and twenty indices each may be selectively exposed to view and each push button may have three different indices visually aligned with it. Control means in the form of switches are actuated by the movable leaves to automatically effect group selection and eliminate any possibility of error on the part of the operator in that respect, as could readily occur if all indices were exposed to view at all times and the operator were required to make a group selection by manually actuating one of a plurality of group control members. Such automatic group selection control means thus insures actuation only of the proper one of the possible three different controlled operations which can result in response to depression of each selector button. In other words, actuation of selector button #1 will result (1) in operation of selection #1 in the first group identified by index #1, on page one if the first group comprising pages one and two is exposed to view; (2) in operation of selection #21 identified by index #21, which is correspondingly positioned relative to selector button #1 on page three, if the second group comprising pages three and four is exposed to view; or (3) in operation of selection #41 if the third group comprising pages five and six is exposed to view, since index #41 then is superposed over indices #21 and #1.

Another object of the invention is the provision of a relatively simple and inexpensive transmitter for automatically transmitting individually identifiable selection signals to the controlled mechanism in desponse to actuation of such selectively operable control members. This object is attained in the instant embodiment by use of a coding or pulsing system employing only a three wire transmitting conductor and including a wiper arm cyclically operable in response to depression of any one of the selector buttons to successively wipe over two series of contacts which are controlled, respectively, by the several selector buttons and the leaf-actuated control switches to transmit two spaced pulse trains over a single signal line. The first such train in each instance comprises a particular number of pulses corresponding to the particular selector button which is depressed, the circuit being controlled in response to depression of each selector button to energize a corresponding number of the spaced contacts of the first series. A greater spacing is provided between the two series of contacts successively engaged by the wiper arm than that separating the contacts of each series to differentiate between the two signal trains. The second train in each instance comprises no signal if the first group of pages one and two of the indices is exposed, one signal pulse if pages three and four comprising the second group of identifying indices is exposed, and two pulses if the third group of indices is exposed to the view of the operator so that the actuated selector button is visually associated with an index on pages five or six. This second signal train is controlled automatically by the previously mentioned switches actuated by the movable program or index supporting leaves.

A further important object of the instant invention is to insure proper operation of such control mechanism by providing novel full cycle means which prevents an operator from effecting a second or successive selection until the signal resulting from a preceding selection has been completed. In the illustrated embodiment this full cycle control mechanism comprises push button locking members, actuated in response to initiation of a signal cycle by depression of any one of the selector buttons, to lock the actuated push button in depressed position and block all of the other selector buttons to prevent their depression until the selected signal has been effected.

Another object is to eliminate selection stealing by preventing anyone, other than the operator depositing a coin, from presetting a push button to effect a selection when the coin is deposited. This object is attained in the instant machine by the automatic return of the push button locking members of the full cycle control mechanism to a normal inoperative position after each signal cycle, wherein they cannot latch or retain any of the push buttons in depressed position, and the provision of coin controlled accumulator mechanism which, in addition to its usual function, automatically effects initial movement of the full cycle locking members to an operable or latching position for latching any subsequently actuated selector button in depressed position.

A further object of the invention is to facilitate insertion and replacement of the identifying indices by providing a readily removable program holder as a subassembly or unit comprising both the stationary pages and the movable leaves, and novel and simplified means for mounting such unit in proper relationship to the selector buttons to insure visual alignment of the indices with their individual buttons.

Numerous other objects and advantages of the invention will be apparent as it is better understood from the following description, which, when taken in connection with the accompanying drawings, discloses a preferred embodiment thereof.

Figure 5:
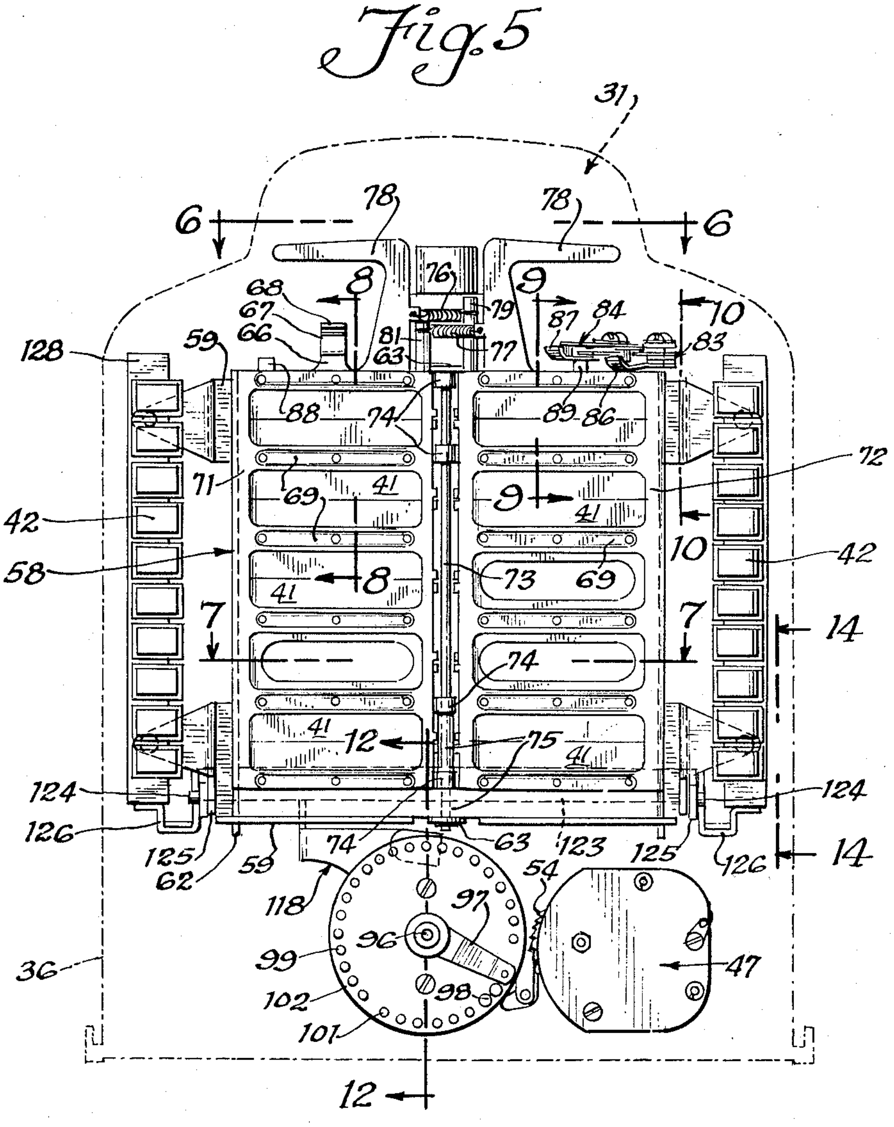
Fig. 5 is an enlarged view similar to Fig. 2 with the front cover member removed, the back plate shown in broken lines and some parts omitted for the sake of clarity.
Figures 6, 7, 8, 9, 10:
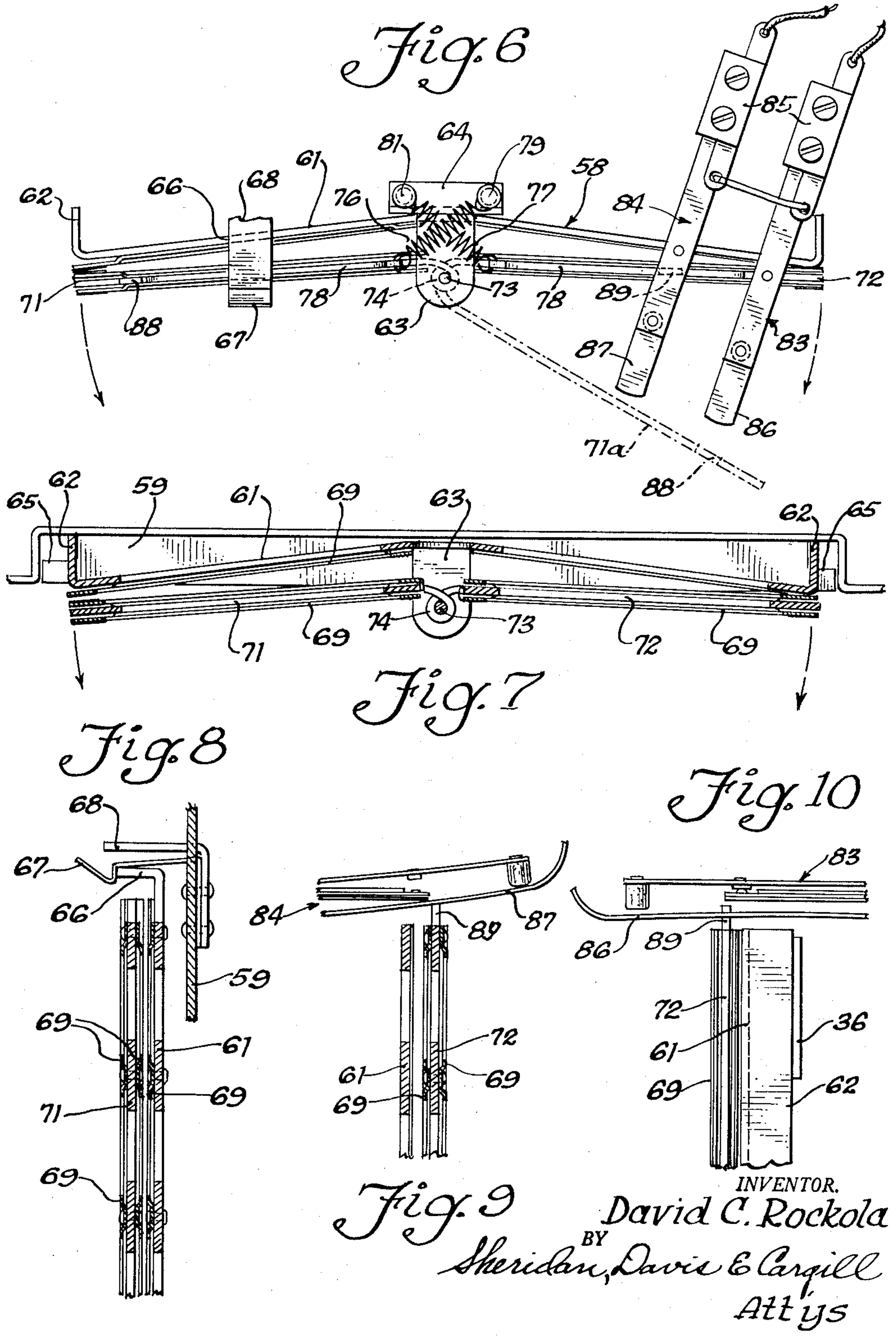
Fig. 6 is a plan view of the program holder of the remote control unit, as seen from the line 6—6 of Fig. 5.
Fig. 7 is a view similar to Fig. 6, as seen substantially on the line 7—7 of Fig. 5.
Figure 11:
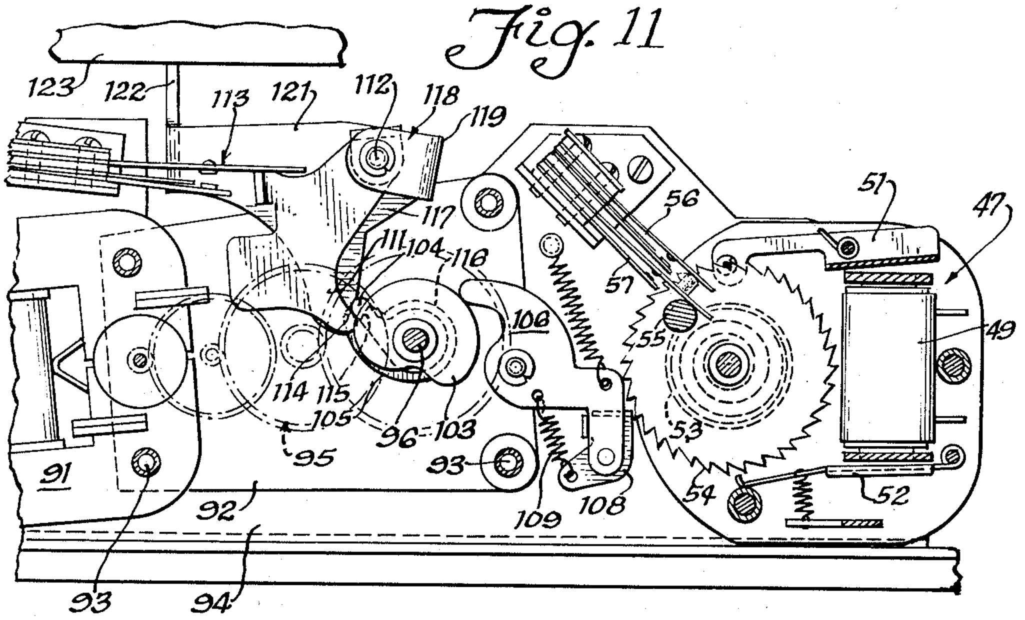
Figure 12:
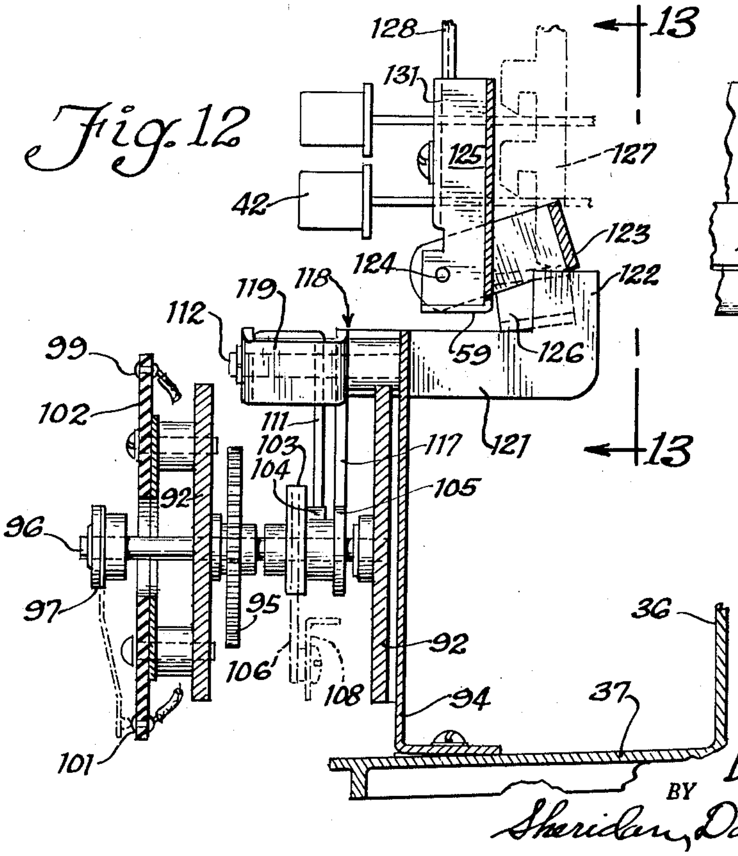
Figure 13:
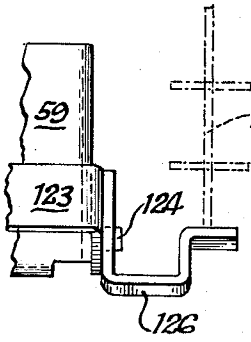
Figure 14:
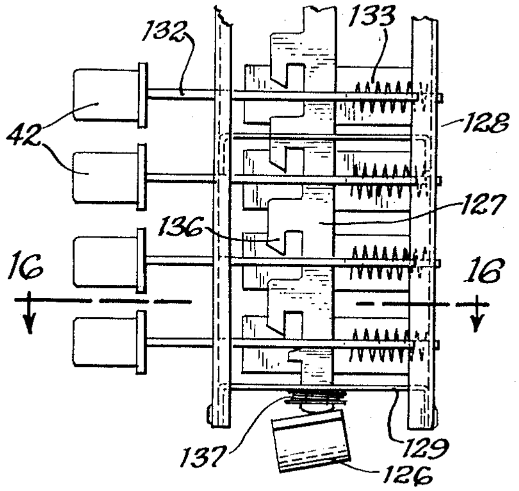
Figure 15:
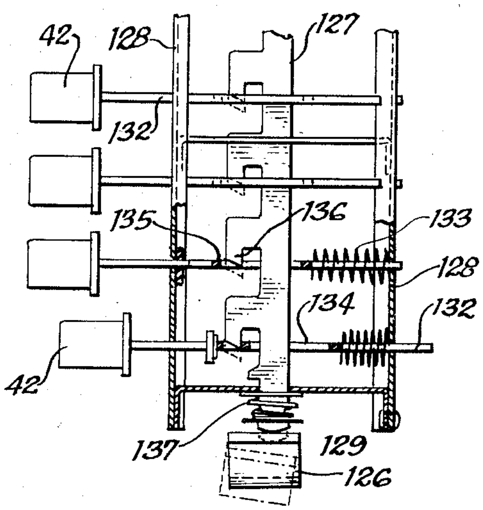
Figure 16:
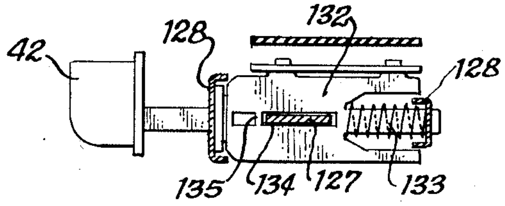
Figure 17:
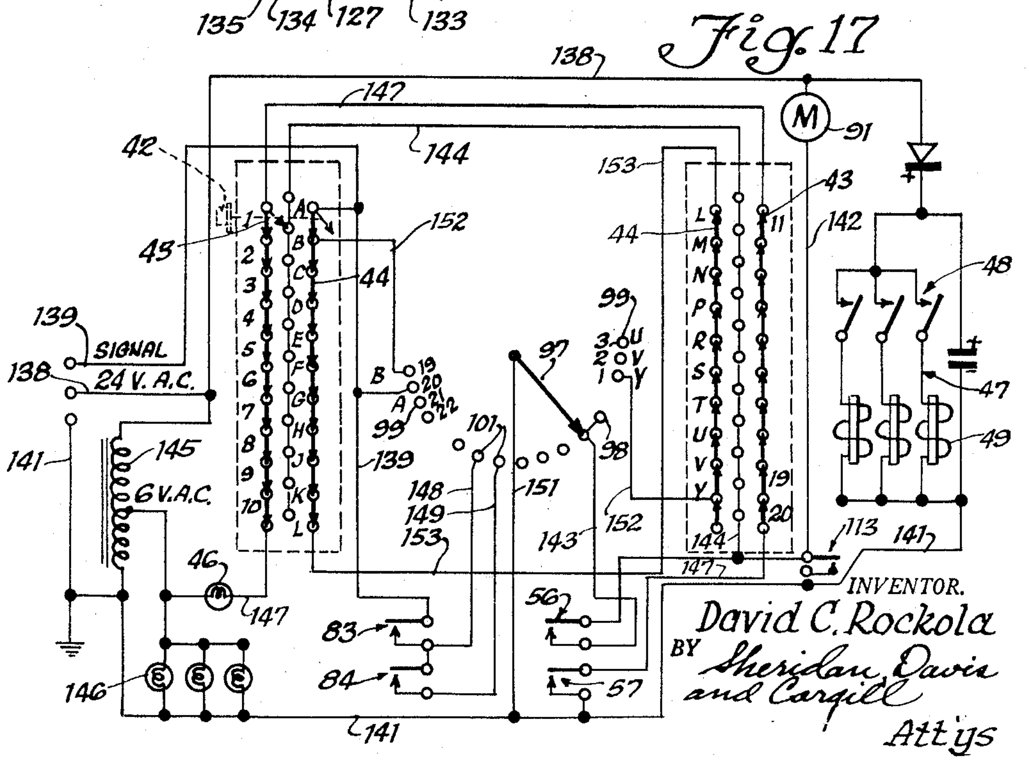

Figs. 8, 9 and 10 are detail vertical sections taken substantially on the lines 8—8, 9—9, and 10—10, respectively, of Fig. 5;

Fig. 11 is an enlarged front elevation of the lower portion of the control unit of Fig. 5 with the front plate of the accumulator and the signal transmitter removed;

Fig. 12 is an enlarged vertical section taken substantially on the line 12—12 of Fig. 5;

Fig. 13 is a detail rear elevation as seen from the line 13—13 of Fig. 12;

Fig. 14 is an enlarged side view, as seen from the line 14—14 of Fig. 5, showing some of the control buttons and their locking member in normal inoperative positions;

Fig. 15 is a view similar to Fig. 14 showing one of the control buttons in depressed or operative position, with its locking member in intermediate latching position in full lines and in key-locking position in broken lines;

Fig. 16 is a detail horizontal section taken on the line 16—16 of Fig. 14;

Fig. 17 is a wiring diagram of the remote control and transmitter unit; and

Figure 18:
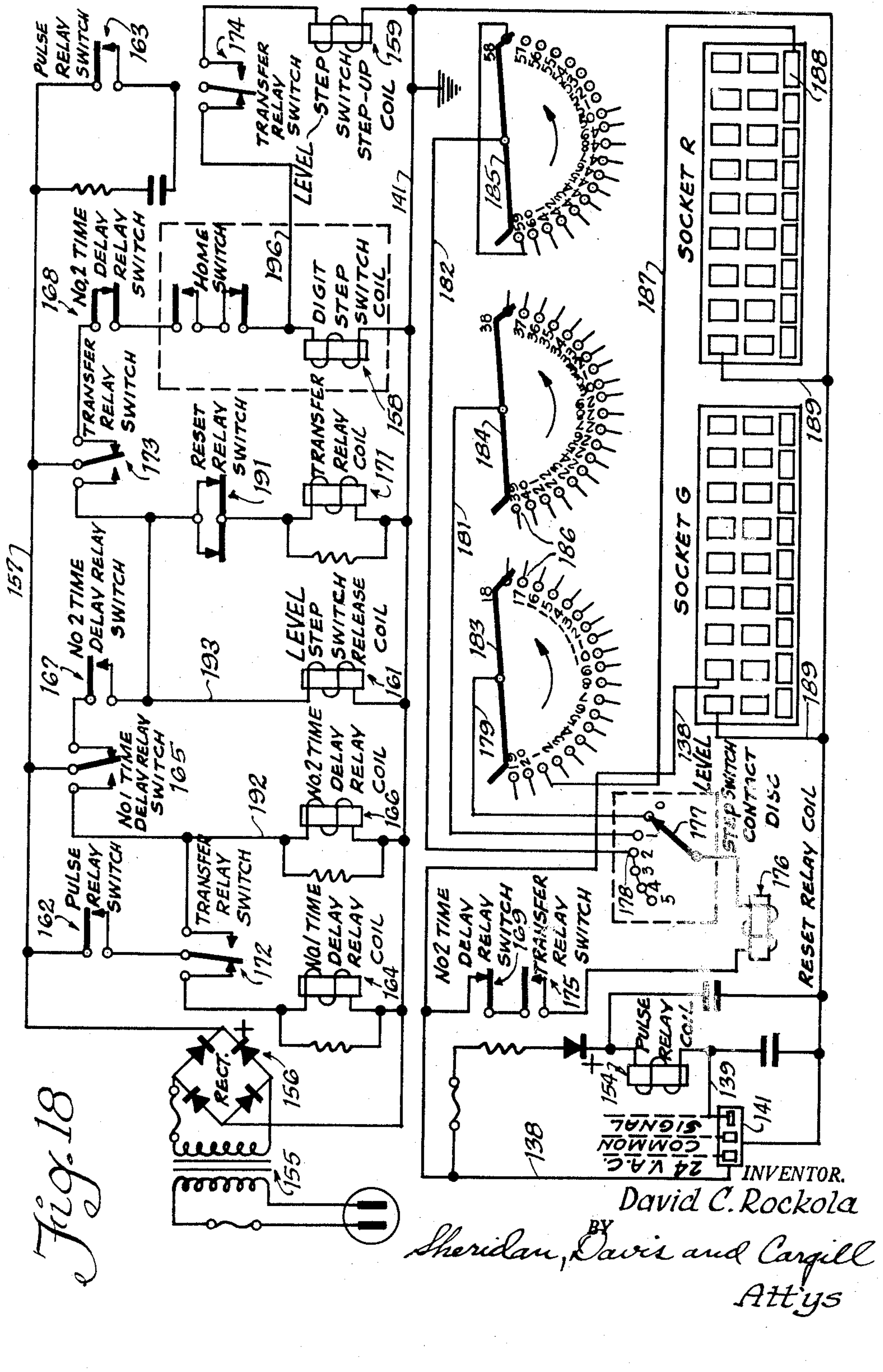

Fig. 18 is a wiring diagram of the signal receiver unit.

Figure 1:
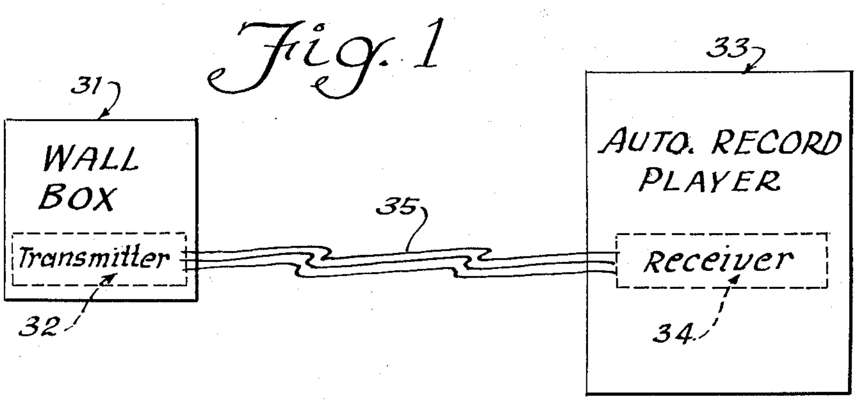
Figure 1 is a diagrammatic illustration of a preferred embodiment of my invention.
Figure 2:
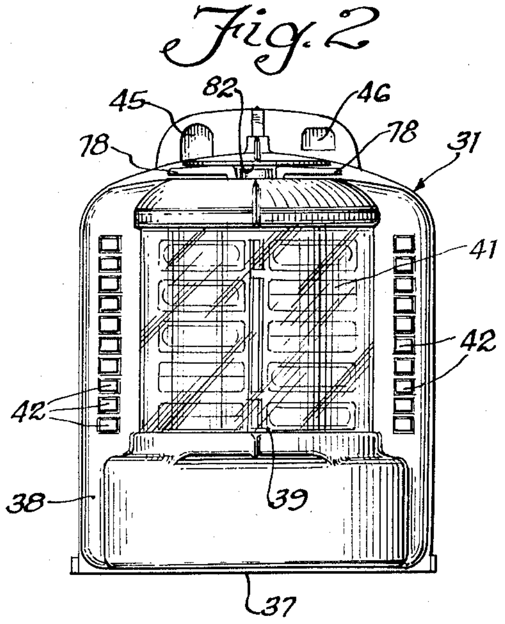
Fig. 2 is a front elevation of a remote control unit, such as that shown at the left side of Fig. 1.

Referring more particularly to Fig. 1 of the drawings, the instant invention is illustrated diagrammatically as embodied in an automatic phonograph having a remote control unit, such as a wall box 31, including a transmitter or signal effecting means, designated generally by reference numeral 32, and a device for selective operation under the control thereof, such as a record player 33, including a receiver or signal interpreting means, designated generally by reference numeral 34, interconnected electrically with the transmitter 32 by a simple three wire conductor 35. Figs. 2–5 show the selectively operable control mechanism or wall box 31 as an illustrative embodiment of my invention having a back plate or supporting frame 36 (Figs. 4 and 5) formed integrally with a forwardly extending base plate 37 (Fig. 12), and a cover member 38 which may be removably mounted thereon in similar manner to that disclosed in my copending application Serial No. 216,152, filed March 17, 1951, and issued June 5, 1956 as Patent No. 2,748,973. The cover 38 includes a centrally disposed and forwardly protruding, curved window 39 (Figs. 2 and 3) through which suitable identifying indices 41 may readily be seen, and two parallel rows of apertures to accommodate selectively operable push buttons or manual control members or keys 42, shown as numbering ten in each row, which thus are marginally associated and visually aligned each with one of the visible indices 41. As shown in the wiring diagram of Fig. 17 for the control unit, each push button 42 when depressed actuates a double switch 43, 44 of well-known construction. The control unit 31 also includes the usual coin-receiving slot 45 and a "make selection" light 46, as best seen in Fig. 2.

Deposit of one or more coins in the slot 45 causes positive or additive actuation of an accumulator, indicated generally by reference numeral 47 in Figs. 5, 11 and 17, in the manner fully described in U.S. Letters Patent No. 2,613,791, issued October 14, 1952 and application Serial No. 196,663, filed November 20, 1950 now abandoned. Briefly, coins of different denominations close different switches 48 (Fig. 17) to energize the proper coil 49 which results in clockwise movements of pawls 51 and 52 from their normal position of Fig. 11 against their springs, and immediate release thereof to permit accumulator spring 53 to rotate ratchet wheel 54 additively (counter-clockwise in Fig. 11) in an accumulative amount corresponding to the value of the deposited coins. A stud 55 carried by ratchet wheel 54 of the accumulator normally holds a pair of accumulator switches 56, 57 open, and the latter are both closed as stud 55 moves out of contact therewith in response to such additive actuation of the accumulator, and remain closed so long as any positive value remains in the accumulator.

Referring now to Figs. 5–10, a novel removable program holder or supporting means for identifying indices 41, indicated generally by reference numeral 58, is illustrated as supported and retained against forward movement at its lower end by the lower horizontal shelf portion of a frame plate or bracket 59 (Figs. 5 and 7) secured in any suitable manner to the back plate 36. The holder 58 comprises a backing frame 61 which terminates at its sides in rearwardly directed, vertical flanges 62, and is provided with forwardly extending and centrally disposed top and bottom tabs or horizontal shelf portions 63 and a somewhat similar rearwardly extending bracket 64 at its upper end (Fig. 6). The rear portions of the lower ends of the vertical side flanges 62 extend downwardly to engage in suitable recesses 65 in the supporting shelf portion of bracket 59 (Fig. 7) to insure proper central positioning of the holder 58 on the back plate 36 and to prevent forward movement of the lower portion of the holder frame 61. The upper edge of the backing frame 61 has a forwardly extending holding tab 66 (Figs. 5 and 8) which cooperates with a shouldered leaf spring 67 extending forwardly from, and secured in any desired manner to an upper portion of frame plate or bracket 59 which may be a separate upper plate mounted by any suitable means in the plane of the lower plate 59 on the back plate 36, if desired, to releasably retain the upper portion of the holder frame 61 against movement relative to back plate 36. The spring 67 preferably has a horizontally extending backing bracket 68 disposed above it to limit its upward movement by tab 66 as the latter is moved rearwardly (from left to right in Fig. 8) in mounting the holder 58 on the back plate 36. This not only prevents upward bending of spring 67 beyond its elastic limit, but of more importance it positively insures proper seating of frame 61 on the bracket or frame plates 59 and prevents latching of the holder 58 or the back plate 36 in any position except that in which the supported indices 41 are properly visually aligned with their associated push buttons 42. As best seen in Figs. 5 and 8, the backing frame 61 has riveted or otherwise secured in any suitable manner to its forward face a plurality of horizontal rails 69 spaced vertically from each other, respectively, a sufficient distance to slidably receive and retain the indices 41. With the spacing of these rails 69 illustrated, each index 41 thereby retained vertically subtends two adjacent push buttons 42 and will have two sets of identifying indicia inscribed thereon, each horizontally aligned with one of the control member 42. For controlling operation of an automatic phonograph, which is the intended function of the embodiment of the invention illustrated, such arrangement greatly facilitates record substitution, since the identifying indicia for the recordings on the two sides of each record may be inscribed on a single index 41. As shown in Figs. 6, 7, and 9, the right-hand half of the backing frame 61 may have these index retaining rails 69 omitted therefrom when only fifty selections, instead of sixty, are to be made available, as is the case with the specific receiver unit 34 diagrammed in Fig. 18, in which case the space provided by this right side of frame 61 may be utilized for advertising or other desired purposes. In any case, the backing frame 61 thus provides left and right-hand stationary page members, when properly mounted on the back plate 36, either or both of which supports a plurality of vertically spaced indices 41 to provide a plurality of identifying indicia respectively aligned with the different push buttons 42.

The program holder 58 also comprises a plurality of movable leaves or page members, herein illustrated as two in number and identified by reference numerals 71 and 72. A vertical shaft 73 spaced forwardly from the central portion of backing frame 61 is secured to, and supported in any suitable manner by, the top and bottom tabs 63 (Figs 5–7). The inner edge of page member 71 has a pair of spaced hinge straps or loops 74 extending therefrom adjacent its top and bottom for pivotally embracing the shaft 73, and the other page member 72 is provided with similar straps or loops 74 (Fig. 5) likewise embracing shaft 73. Suitable spacing collars 75 are mounted on shaft 73 between the two lowermost hinge loops 74 and the lowermost one thereof and the bottom tab 63 to prevent vertical movements of members 71, 72 relative to the backing frame 61. The movable page members 71 and 72 thus may be swung together or independently of each other about shaft 73 between left-hand and right-hand positions wherein they are superposed, respectively, over the left or right half of the backing frame 61. Each of the front and rear surfaces of these movable leaves or page members 71, 72 is provided with index receiving rails 69 similar to those on backing frame 61, so that the members 71, 72 with indices 41 mounted thereon comprise book-like leaves of opposed pages. The program holder 58 thus designed is adapted for selective exposure of any one of the following three groups of indices 41:

I. Pages 1 and 2, comprising the left half of backing frame 61 and the front side of page member 71 when it is in its right-hand position;

II. Pages 3 and 4, comprising the front sides of page members 71 and 72 when they are disposed, respectively, in their left and right-hand positions of Figs. 5, 6 and 7; and III. Page 5, comprising the front side of page member 72 when in its left-hand position; or that page 5 and page 6, comprising the right half of backing frame 61, if the latter is provided with the index receiving guide rails 69.

Figure 3:
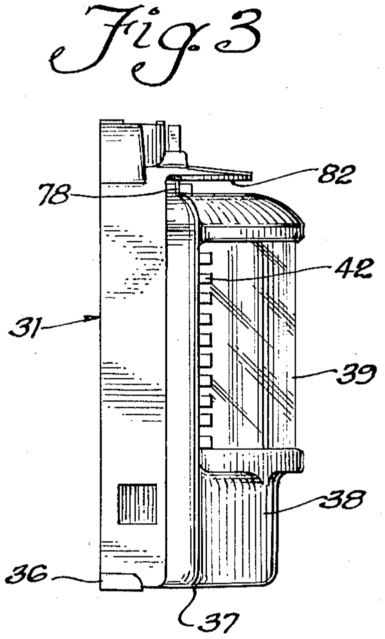
Fig. 3 is a side view of the control unit of Fig. 2, as seen from the left side thereof.
Figure 4:
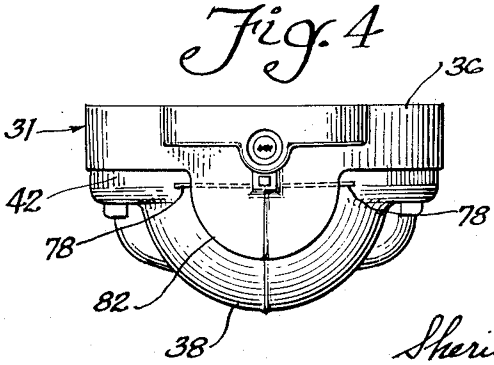
Fig. 4 is a top plan view of the unit of Fig. 2.

Means also are provided, as part of program holder 58, for resiliently maintaining the movable page or leaf members 71 and 72 in one or the other of their extreme left or right-hand positions, in order to avoid any possibility of confusion as to which selection will result from depression of any particular push button 42. This resilient retaining means comprises a pair of coil springs 76 and 77 connected at their forward ends to the upstanding legs of leaf actuating finger pieces 78 (Figs. 5 and 6) which preferably are formed as extensions of the leaf or page members 71, 72 and terminate in horizontally extending handle portions disposed in the vertical plane of their respective members 71, 72. Spring 76 is connected at its rear end to a vertical stud 79 extending upwardly from the bracket 64 to the rear of backing frame 61 and to the right of central shaft 73, and spring 77 is similarly connected at its rear end to a like pin or stud 81 to the left of shaft 73. Pivotal movement of the page members 71 and 72 thus will swing the forward ends of their respective springs 76 and 77 from one to the other side of their pivot shaft 73, so that these springs will effectively resiliently retain their page members in one or the other of their two extreme left or right-hand positions. It will also thus be seen that springs 76 and 77 are connected as resilient toggle-like actuators for their page members 71 and 72, each spring functioning to move its page member to either its left or right-hand position whenever the page member is manually released, depending upon whether the point of connection of the forward end of the spring with its finger piece 78 is to the left or right of shaft 73. As a specific illustration, if page member 71 is swung counter-clockwise from its left-hand position of Fig. 6 manually and released, spring 76 will return it to that position of its forward end at the moment of release is to the left of a vertical plane through shaft 73 and stud 79, but if that forward point of connection of the spring with finger piece 78 has been moved to the right of such vertical plane, the spring 76 will move the page member through its broken line position **71*a* (Fig. 6) to its right-hand position overlying page member 72. As best seen in Figs. 2–4, the cover 38 preferably is provided with a horizontal recess 82 for accommodating and giving access to the leaf actuating finger pieces 78**.

Referring back to Figs. 5, 6, 9, 10 and 17, control means are provided which are automatically operable by the movable page members 71, 72 to effect group selections or automatic selection of that group of controlled mechanisms identified by the visually exposed group of indices 41. This control means comprises a plurality of group signal switches, being two in number in the illustrated embodiment of the invention, designated by reference numerals 83 and 84. These switches 83, 84 are normally closed leaf switches mounted in the usual manner at their rear ends in laminated insulated blocks 85 with the rear ends of underlying leaf springs 86 and 87, respectively, the forward ends of the springs 86, 87 being curved upwardly as shown in Figs. 5, 9 and 10. The insulating blocks 85 are mounted in any suitable manner on the back plate 36, and switches 83 and 84 are adapted to be opened and held open whenever their associated movable page members 71 and 72 are swung to their right-hand positions. For this purpose each of the page members 71 and 72 is provided, respectively, with an upstanding lug 88 and 89 on its upper edge and spaced inwardly from its outer edge to swing under and raise its associated leaf spring 86 and 87 when the page members are moved to their right-hand positions. For example, with page member 71 in its left-hand position and page member 72 in its right-hand position, as shown in Figs. 5 and 6, lug 88 is at the opposite side of the unit from switch 83 so that the latter is closed as shown in Fig. 10, while lug 89 is disposed under switch actuating spring 87 and maintains switch 87 open, as shown in Fig. 9. The broken line position **71*a* of page member 71 in Fig. 6 illustrates how lug 88 will similarly actuate or raise spring 86 as the movable page member 71 is swung therefrom rearwardly or in a counter-clockwise direction by its coil spring 76. Thus with both page members 71 and 72 in their right-hand positions to expose the indices 41** of previously defined group I, both switches 83 and 84 are open; with the page members disposed in their opposed positions of Fig. 6 to expose the indices of group II, switch 83 is closed and switch 84 is open; and both switches 83 and 84 are closed whenever both page members 71 and 72 are in their left-hand positions to expose the indices 41 of group III.

The control unit 31 includes a motor 91 (Figs. 11 and 17) mounted in well-known manner in an auxiliary frame comprising a pair of parallel plates 92 (Fig. 12) secured together by suitable spacers and bolts 93 (Fig. 11) and mounted by the latter on a frame plate 94 which is upstanding from and secured to the base plate 37 (Fig. 12). A gear train 95 connects the rotor of motor 91 to drive a horizontal shaft 96 suitably journaled in the auxiliary frame plates 92 and extending forwardly through the front one of those plates (Fig. 12). The forward end of shaft 96 carries a contact wiper arm 97 (Figs. 5 and 12) for successively engaging, first a pair of contacts 98, and then two series of contacts 99 and 101, in each cycle of operations comprising one complete rotation of the shaft. The several contacts 98, 99 and 101 are carried by and spaced peripherally around an insulation disc 102. As seen in Fig. 12, the disc 102 is mounted upon the forward auxiliary frame plate 92. The shaft 96 also has mounted thereon three cams 103, 104 and 105. The front cam 103 actuates a follower lever 106 (Fig. 11), which is held in engagement therewith by a spring 107, and a pawl 108 pivotally mounted on the outer end of lever 106 and resiliently-retained in operative position by a spring 109. A rearwardly extending shelf or nose on pawl 108 (Fig. 12) cooperates with the units ratchet wheel 54 of the accumulator 47, being raised by spring 107 near the end of each cycle of operations, as permitted by cam 103, to subtract one unit of value from the accumulator by rotating the units wheel 54 one incremental step in a clockwise direction, viewing Fig. 11. Cam 103 and members 106—109 thus comprise the accumulator zeroizing or debiting means.

The intermediate cam 104 actuates a lever 111 which is pivoted on a stud shaft 112, in turn secured at its rear end to the frame plate 94 (Fig. 12). In the normal inoperative position shown in Fig. 11 assumed by the parts at the end of a cycle of operations, lever 111 is held in an upper position by cam 104 to maintain open a motor full cycle switch 113 which is mounted in well-known manner on frame plate 94.

The rear cam 105 on shaft 96 has a rise or high point 114, an intermediate portion 115 and a low part 116 (Fig. 11) cooperating with the lower end of a depending arm 117 of a key lock blocking and releasing bell crank lever 118. Intermediate its ends, bell crank 118 is provided with a forwardly extending hub portion 119 that is pivotally mounted on stud shaft 112 (Fig. 12). The remaining arm 121 of bell crank lever 118 extends rearwardly through a suitable opening in frame plate 94 and terminates in an upstanding finger or end portion 122 which underlies, and normally supports in an upper operative position, the transverse body portion of a key lock blocking bail or rocker bar 123. As shown in Figs. 5 and 12, bail 123 terminates at its ends in forwardly extending arms which are pivoted at 124 to forwardly extending end flanges 125 of frame plate 59 and have secured thereto in any suitable manner lateral extensions 126. Each extension 126 of bail 123 (Figs. 12–15) underlies the lower end of a vertical key lock slide or bar 127 associated with one of the two banks of ten push buttons or selector keys 42.

Each of these banks of selector keys 42 comprises front and rear vertical frame plates 128 (Fig. 15) secured together in spaced relationship by top and bottom spacer plates 129, the front frame plates 128 being mounted in well-known manner on lateral extensions 131 (Figs. 5 and 12) of the end flanges 125 of frame 59. Each push button 42 has a key stem 132 mounted in the usual manner for limited horizontal sliding movement in suitable slots in frame plates 128 for actuating its associated switches 43, 44, and is urged forwardly by a spring 133 (Fig. 15). The key lock slide or bar 127 of each bank extends through intermediate slots 134 in its associated key stems 132. These slots 134, along with shorter forward slots, also define a transverse web 135 in each key stem for cooperation with an associated cam and key-latching and locking nose 136, one of which is formed as a forward and downward extension on the forward edge of each slide 127 adjacent each key stem. The lower end of each slide or bar 127 below the bottom plate 129 has a spring 137 mounted thereon which urges the slide to a lowermost key-locking position, as shown in broken lines in Fig. 15.

Referring now to Fig. 17, which comprises a schematic wiring diagram of the circuit for the remote control unit 31 and its signal transmitter 32, it will be seen that this circuit includes a power line 138, preferably supplying alternating current of 24 volts, a signal line 139 and a common ground line 141. These three lines 138, 139 and 141 are connected to similar lines in the receiver or signal interpreting unit 34 (Fig. 18) in well-known manner by the simple three wire conductor 35 shown in Fig. 1. Again referring to Fig. 17, it will be seen that the supply line 138 is connected at the right side to that figure through a suitable rectifier in parallel to the several coin switches 48 of the accumulator 47. The other sides of these normally open coin switches 48 are connected, respectively, to one side of their associated accumulator coils 49, the other sides of which are connected to the ground wire 141. One side of the motor 91 is connected to the supply line 138, while its other side is connected by a conductor 142 to one side of the first accumulator switch 56 and one side of the full cycle switch 113. The other side of normally open switch 113 is connected to the common ground 141. The other side of normally open switch 56 is connected by a conductor 143 to the two motor contacts 98 on the disc 102. A conductor 144 is connected to the first side of accumulator switch 56 and conductor 142 and extends through the two key banks for cooperation with the outer or forward push button switches 43, in a manner to be later described.

Interconnected between the supply line 138 and the common ground 141, as seen at the left in Fig. 17, is a suitable transformer 145, the secondary of which is connected to one side of the make selection light 46 and a plurality of program lights 146. The other sides of these program lights 146 are grounded to the common line 141, and they are suitably located in the casing of control unit 31 to illuminate the coin slot 45 and the program holder 58. A conductor 147 connects the other side of make selection light 46 through the several normally closed push button switches 43 to one side of the normally open second accumulator switch 57. The other side of this switch 57 is connected to the common ground 141. In the lower central portion of Fig. 17 it will be seen that the signal line 139 is connected to one side of the first page signal switch 83, the other side of this switch being connected both to one side of the second page signal switch 84 and, by a conductor 148, to the second pulse train contact 101 second-from-the-left in the group of six such contacts 101 illustrated. The next-to-the-right or third such contact 101 is connected by a conductor 149 to the other side of the second page switch 84. The contact wiper arm 97 is connected by a line 151 to the common ground 141. The inner or rearward push button switch 44 operable by the number one key or push button 42 is shown as connected from point A to the signal line 139, and the latter also is connected at A on the disc 102 to the last three contacts 99 thereon of the first pulse train, being the contacts numbered 20, 21 and 22. In similar manner, conductors 152 respectively connect the other push button switches 44 with those contacts 99 identified by the capital letters corresponding to those identifying the push button switches 44. A conductor 153 connects the normally closed push button switches 44 of the two key banks in series.

The operation of the selectively operable control mechanism so far described is as follows. Assuming that all selections previously made have been effected, the various parts stop and are in their normally inoperative positions, as illustrated in Figs. 5, 11, 14 and 17. In such positions, all of the push buttons or selection keys 42 may be depressed or moved rearwardly, but such operation will have no effect whatever. The only time that depression of a push button 42 will be effective is at the end of any cycle of operations, or prior to the start thereof, while one or more units of value are registered in the accumulator 47 by virtue of prior deposit of a proper coin or coins in the coin slot 45. As previously described, deposit of any proper coin or coins in the coin slot 45 results in such coin closing one or the other of the switches 48 and, as will best be appreciated from the wiring diagram of Fig. 17, that will cause actuation of the associated accumulator coil 49. Referring to Fig. 11, such energization of coil 49 moves the two pawls 51 and 52 clockwise to disengage the former and engage the latter with the associated accumulator ratchet wheel 54 to allow spring 53 to rotate the accumulator in a counter-clockwise direction. Such rotation is limited in the first instance by pawl 52 and, in response to the substantially immediate de-energization of coil 49, in the second instance by the pawl 51 which, together with pawl 52 are returned to their normal positions of Fig. 11 by their associated springs. One or more units of value corresponding to the value of any deposited coin thus are accumulated, and the stud 55 is moved out of engagement with the accumulator switches 56, 57 to permit those normally open switches to be closed.

Two things result from such deposit of one or more coins in the control unit. One of these occurrences is the closing of the second accumulator switch 57, which completes a circuit through the make selection light 46. As shown in Fig. 17, this circuit extends from the transformer 145 through conductor 147 and the several normally closed push button switches 43 and switch 57 to the common ground line 141. The operator is thus apprized that the control unit has been rendered operative and that any subsequent depression of a selected push button 42 will be effective to cause actuation of the corresponding controlled element in the record player 33 or other mechanism controlled by the unit 31. The second of these occurrences comprises the simultaneous closing of the first accumulator switch 56. Closing of the first accumulator switch 56 completes a circuit through motor 91 from the supply line 138 through conductor 142, switch 56, lead 143, contacts 98, wiper arm 97 and lead 151 to the common or ground wire 141. Motor 91 is thereby energized until, through gear train 95 and shaft 96, wiper arm 97 is moved in a counter-clockwise direction (viewing Figs. 5 and 17) out of contact with the upper of the two contacts 98. At that time, such circuit through motor 91 will be broken, and the operating mechanism will come to rest. This initial operation of motor 91 also rotates cams 103, 104 and 105 in a counter-clockwise direction (viewing Fig. 11) through a comparable angular distance. Such incremental actuation of cams 103 and 104 will have no effect upon their respective cam followers 106 and 111. However, it will result in the high portion or rise 114 of cam 105 being moved downwardly out of contact with the lower end or arm 117 of bell crank 118, and the parts will come to rest with this end of arm 117 in contact with the intermediate portion 115 of cam 105. The bell crank 118 is thus moved a short distance about its pivot 112 in a counter-clockwise direction from its normal position of Fig. 11, which results in the bail 123 and its extensions 126 moving downwardly from the position of Figs. 11–14 to the full line position of Fig. 15. In such intermediate position, the extensions 126 maintain the key lock bars or slides 127 in their intermediate full line position of Fig. 15. In this second or latching position, the slides 127 will function to latch any actuated push button 42 in its depressed or operative position. It will be readily understood, of course, that depression of any other push button 42 in the same key bank, following latching of one of the members 42 in its depressed position, as illustrated by the lowest push button 42 in Fig. 15, will result in the latter push button being released for return to normal position by its spring 133 and similar latching of the subsequently actuated push button in depressed position. Such action results from the transverse web 135 of the subsequently depressed key stem 132 camming the slide 127 against its spring 137 by contact against the lower angularly disposed end surface of the associated nose 136. While depression of a push button 42 in the other key bank from that in which a previously depressed push button is latched in actuated position will not release such previously depressed push button 42, for reasons that will more clearly appear later, only that push button 42 having the lowest identifying number will be effective to make a selection.

Following coin-responsive actuation of the accumulator 47 and the resulting turning on of make selection light 46, depression of any selected push button 42 will be accompanied by rearward movement of its associated switches 43, 44 from their normally full line positions of Fig. 17 to their broken line positions illustrated therein by push button #1. Switch 43 of selector button #1 thus actuated breaks the circuit through make selection light 46 to turn the latter off and closes a second starting circuit for motor 91. This latter motor starting circuit is traceable in Fig. 17 through conductor 142, conductor 144, the actuated switch 43, conductor 147 (and the normally closed switches 43 of the other key bank) and the second accumulator switch 57. A complete cycle of operations is thereby initiated to rotate shaft 96, wiper arm 97 and cams 103, 104 and 105 in counter-clockwise direction, viewing Figs. 5, 11 and 17, to return the same to their normal rest positions of those figures. During such operation, cam 104 functions to close full cycle switch 113 to maintain motor 91 energized until just prior to completion of the cycle, when it again opens switch 113.

In immediate response to such re-energization of motor 91 following selective actuation of a push button 42, the intermediate portion 115 of cam 105 is moved out of engagement with the lower end of arm 117 to permit bell crank 118 to be further rotated in a counter-clockwise direction (viewing Fig. 11). This movement of bell crank 118, which is limited by engagement of its arm 117 with the low part 116 of cam 105, permits bail 123 and its lateral extensions 126 to fall to a lowermost position. Such movement of extensions 126 is that from the full line to the broken line position of Fig. 15, and is assisted by the weight of slides 127 and the action of their springs 137. Slides 127 thus are lowered to their broken line position of Fig. 15 substantially immediately in response to actuation of any one of the selector buttons 42. The two slides or bars 127 thus assume a third or locking and blocking position to positively prevent subsequent depression or actuation of any other push button or selector 42, and to lock the push button 42 whose depression initiated this cycle of operations in depressed position for the remainder of that cycle. As the cycle of operations is completed, cam 105 raises bell crank 118 to its normal position of Fig. 11. During the latter part of such movement, the extensions 126 of bail 123 are lifted from their position of Fig. 15 to that shown in Fig. 14, which results in return of slides 127 to their first or normal inoperative position to release the depressed push button 42 for return by its spring 133 to normally inoperative position near the end of the cycle of operations. In the meantime, cam 103 has permitted actuation of lever 106 and pawl 108 by spring 107 to reversely actuate the units order ratchet wheel 54 to subtract or debit one unit of value from the accumulator 47. Such debiting action must be accomplished before the end of the cycle of operations in order that cam 103 may return lever 106 and pawl 108 to their normal inoperative position of Fig. 11. Consequently, if such debiting actuation zeroizes the accumulator 47 by removing therefrom the last unit of value previously registered in response to coin deposit, stud 55 will thereby open the accumulator switches 56, 57 before the end of the cycle of operations. While this will result in the opening of the starting circuit through motor 91 including conductor 147, the full cycle switch 113 will insure continued actuation of motor 91 until it in turn is opened just prior to the very end of the cycle by cam 104. In such event, the parts actuated by motor 91 will come to rest in their normal positions of Figs. 5, 11 and 17. If, however, that cycle of operations does not result in zeroizing of the accumulator 47, and any additional unit or units of value remain therein, the accumulator switches 56, 57 remain closed. As a result, the first motor-initiating circuit through conductor 142, switch 56 and conductor 143 will be energized as the wiper arm 97 returns to its normal position of Fig. 17 to continue operation of the motor 91 until wiper arm 97 is moved out of engagement with the second contact 98. The previously effective push button 42 having been returned to normal position, make selection light 46 is again energized to indicate to the operator that unit 31 is in condition for a subsequent selection to be made. Thus each selective actuation of a push button 42 will effect a complete cycle of operations of the control unit, and the number of selective cycles that may be initiated will depend upon the number of units of value registered by the accumulator in response to deposit of proper coins in the coin slot 45 of that particular control unit. If more than one such control unit is connected to the record player 33, or other mechanism to be controlled, which can be done in a manner clearly apparent to anyone skilled in the art, actuation of the selector buttons 42 of any such control unit will have no effect except under the control of the accumulator of that particular control unit.

During each cycle of operations, the wiper arm 97 in its counter-clockwise rotation, viewing Fig. 17, successively engages each of the first pulse train contacts 99 and then each of the second pulse train contacts 101. If the #20 selector button 42 is that which has been actuated, all of the contacts 99 are effective to ground the wiper arm 97 as the latter successively engages them, so that the signal line 139 will transmit a resulting first train signal comprising twenty-two spaced pulses. This is accomplished by wiper arm 97 because there are twenty-two contacts 99, all of which are active when the #20 selector button 42 is locked in depressed position to ground arm 97 through their respective leads 152, the remaining closed push button switches 44 and conductor 153, and the connection from point A of the switch 44 associated with the #1 push button 42 to the signal line 139. In the event of any other smaller numbered push button 42 being that which is locked in depressed position, it will be seen that its resultingly opened switch 44 will break this last-described circuit to render inactive all of the contacts 99 associated with the higher numbered push buttons 42. Thus, for example, if the #1 push button 42 is that which is locked in depressed position, all except the last three contacts 99, which are identified as #20, #21 and #22, will be rendered inactive by the resulting opening of the switch 44 associated with that #1 push button 42, as illustrated in broken lines in Fig. 17. As a result, only three spaced signal pulses will flow through signal line 139, which will occur as wiper arm 97 successively engages those contacts 99 numbered 20, 21 and 22. In other words, the first signal train resulting from effective depression of any selector button 42 will consist of a series of spaced pulses through signal line 139 of a number comprising two more than the number identifying the depressed push button. It will also be seen from the above that simultaneous depression of two or more push buttons 42, either in the same or both key banks, will result in only that signal being given which corresponds, or is that normally given in response to the depression of, the lowest numbered depressed push button 42, since the switch 44 associated with the latter will render ineffective all of the contacts 99 associated with the higher numbered push buttons 42. It will further be seen from the above that release of the push buttons 42 by action of the cam 105 may be accomplished at any time during the cycle of operations after wiper arm 97 has passed the #22 contact 99. Thereafter in each cycle of operations, the switches 43, 44 perform no function, other than that of the switches 43 in closing causing re-energization of the make selection light 46, providing accumulator 47 still contains some positive values so that its switch 57 remains closed.

As will be noted in Fig. 17, the spacing between the last or #22 contact 99 of the first pulse-train-controlling series of contacts and the first contact 101 of the series of contacts controlling the second pulse train signal is greater than that separating the several contacts 99 from each other. The significance of this spacing arrangement of the contacts engaged by wiper arm 97 will be more clearly apparent from the following description. Depending upon which group of selections has been rendered active, or which group of indices 41 has been selected by the operator, or rendered visible, by the actuation of the movable page members 71 and/or 72, the two page signal switches 83 and 84 will either both be open or closed, or switch 83 will be closed and switch 84 open, as previously described. Thus, as previously described, if both of the page members 71 and 72 are disposed in their right-hand positions to expose to view the identifying indices 41 of group I, both switches 83 and 84 will be open; if group II has been selected, switch 83 will be closed and switch 84 open; and both switches 83 and 84 will be closed if the indices of group III are exposed to view. The character of the first signal train in each instance depends solely upon which of the selector buttons 42 has been rendered effective, so that the signal given in the first train will be the same in response to depression of any particular one of the push buttons 43, regardless of which group of identifying indices 41 is exposed to view and the condition of switches 83 and 84. These switches 83, 84 determine the character of the signal given in the second pulse train automatically in response to the particular positions of page members 71 and 72. With group I selected and both switches 83 and 84 open, there will be no signal pulses transmitted following those of the first train. With group II of the identifying indices 41 selected and page switch 83 closed, the second signal train will comprise one pulse which is effected in response to grounding of wiper arm 97 from signal line 139, through switch 83, conductor 148 and the second contact 101, as wiper arm 97 engages the latter. With group III selected, both switches 83 and 84 being closed, the second signal train will comprise two spaced pulses, the first as just described, and the second resulting from grounding of wiper arm 97 as it engages the third contact 101, thus completing the circuit from signal line 139 through switches 83 and 84, lead 149, wiper arm 97 and conductor 151 to the common ground line 141. Generally speaking, it is necessary to maintain a constant interval between the first and second signal trains in order to satisfactorily evaluate or decipher the resulting signals at the receiver 34. As will be appreciated from the above, this has been accomplished by the described arrangement of rotating the wiper arm 97 in a counter-clockwise direction and connecting the contacts 99 to the push button switches 44 in reverse sequence relative to the numbering of the selector buttons 42 and the electrical interconnection between their respective switches. In practice, the spacing between the last engaged contact 99 and the first active contact 101 has been so arranged relative to the speed of rotation of wiper arm 97 that the interval between the last pulse of the first signal train and the first pulse of the second signal train, if any, will always be the same, and in the preferred embodiment in the nature of one fifth of a second. At the same time, the interval between pulses in the first signal train is in the nature of one twenty-fifth of a second, being determined by the spacing between each of the adjacent contacts 99 in relation to the speed of rotation of wiper arm 97. This same interval or "off time" may be maintained between the pulses of the second signal train, as determined by the spacing between adjacent contacts 101.

Referring now to Fig. 18, the receiver or signal interpreting unit 34, for which this figure gives the wiring diagram, is designed to count the pulses in the two signal trains carried by the signal line 139 and controlled as above described, to differentiate between the two trains of pulses, to select the proper specific electrical element to be energized to thereby effect the desired selected operation of the phonograph 33, or other controlled mechanism, and to reset itself after thus accomplishnig each selection or cycle of operations. As previously noted, the three lines 138, 139 and 141 of Fig. 17 are connected to the receiver circuit of Fig. 18 (lower left-hand corner) by conductor 35. The coil 154 of a pulse relay comprising part of a pulse-responsive means is connected from supply line 138 to signal line 139, in series with a suitable fuse, resistor and rectifier, so as to be operable in response to each signal pulse effected, as previously explained, by the grounding of wiper arm 97 of the control unit 31. Suitable condensers also are connected between opposite sides of coil 154 and the ground line 141, as shown at the lower left corner of Fig. 18. Refer now to the upper portion of this wiring diagram, a transformer 155 is shown connected to a standard power supply, and a full wave selenium bridge rectifier 156 is connected to the outlet side of the transformer, the ground line 141 and a supply line 157 which thereby provides direct current of 24 volts for operating two time delay relays, a digit step coil 158, a transfer relay, a level step switch step-up coil 159, and a level step switch release coil 161.

The pulse relay, in addition to coil 154 previously described, comprises two switches 162 and 163 which are actuated thereby. The No. 1 time delay relay comprises a coil 164 and a double throw switch 165 actuated thereby, while the No. 2 time delay relay comprises a coil 166 for controlling actuation of one normally open switch 167 and two normally closed switches 168 and 169. The transfer relay comprises a coil 171 and three double throw switches 172, 173 and 174 and a normally open switch 175 controlled thereby. This latter transfer relay switch 175 is connected in seriees with the No. 2 time delay relay switch 169, from the alternate current supply line 138 (lower left corner of Fig. 18), and a reset relay coil 176 and the arm of a level step switch 177. The latter normally engages the #0 contact 178 of a level step switch contact disc containing several numbered contacts 178, is movable step-by-step counter-clockwise by energizations of its coil 159, and is returned clockwise to its zero position of Fig. 18 in response to energization of its release coil 161. The #0 contact 178, the #1 contact 178, and the #2, etc., contacts 178 are connected, respectively, to lines 179, 181 and 182, which are connected in turn, respectively, to wiper arms 183, 184 and 185 of a multiple-armed rotary step-switch which are movable counter-clockwise by energizations of coil 158 to successively engage contacts 186 of that switch. These contacts 186 are numbered in like manner to the identifying indices 41 and are connected, respectively, by conductors 187 to separate contacts 188 of sockets G and R. One of these contacts 188 of each socket is connected to the common ground line 141 by a conductor 189, and another contact 188 is connected to the supply line 138. Thus, suitable plugs and conductors engaging sockeets G and R will interconnect the contacts 186 with the usual selector coils of the phonograph 33, or other individual electrically operable members of the apparatus to be controlled by selector unit 31. The wiper arms 183, 184 and 185 are returned in a clockwise direction to their normal or home position of Fig. 18 in response to energization of reset relay coil 176 in well-known manner. The reset relay also includes a normally closed switch 191 which is held open during energization of its coil 176.

Referring again to the upper portion of Fig. 18, the pulse relay switch 162 is connected in series with the normally closed contact of transfer relay switch 172 and coil 164 from the direct current supply line 157 to the common ground line 141. Coil 164 of the No. 1 time delay relay, as well as coils 166 of the No. 2 time delay relay and 171 of the transfer relay are respectively provided with suitable shunt resistances. The normally open contacts of transfer relay switch 172 and No. 1 time delay relay switch 165 are interconnected by a conductor 192 which also is connected to one side of the No. 2 time delay relay coil 166, the other side of which is connected to the common ground 141. The normally closed contact of switch 165 is connected in series from supply line 157 to one side of the normally open switch 167. The other side of switch 167 is connected by a conductor 193 to one side of the level step switch release coil 161, the other side of which is grounded as shown. Conductor 193 is also connected to the normally open side of transfer relay switch 173 and one side of reset relay switch 191. The latter is connected to one side of transfer relay coil 171, the other side of which is connected to the common ground 141. The arm of transfer relay switch 173 is connected to the supply line 157 and its normally closed contact is connected to No. 2 time delay relay switch 168. The latter is connected in series with a normally open home switch 194, a self impulse switch 195 and the digit step switch coil 158 to the common ground line 141. The latter coil 158 is also connected by a conductor 196 to the normally closed contact of transfer relay switch 174. The arm of switch 174 is connected in series with the pulse relay switch 163, the latter being connected in parallel, as shown in the upper right corner of Fig. 18, with a suitable resistance and condenser. The normally open contact of transfer relay switch 174 is connected in series with level step switch step-up coil 159 to the common ground line 141.

The operation of the receiver or signal interpreting means 34 of Fig. 18 is as follows. At the end of each cycle of operations of the transmitter 32, the several parts of the receiver 34 will assume their normal positions illustrated in Fig. 18. When the first pulse of the first signal train is effected, as previously described, pulse relay coil 154 is thereby energized to momentarily close pulse relay switches 162 and 163. Closing of switch 162 energizes No. 1 time delay relay coil 164 to actuate No. 1 time delay relay switch 165 to close its normally open contact. This energizes No. 2 time delay relay coil 166 which closes switch 167 and opens normally closed switches 168 and 169. The two time delay relays thus are actuated in response to the first signal pulse, and the No. 1 time delay relay is so designed that it will maintain itself in such actuated condition during the time interval (in the nature of $1/25$ of a second) between successive pulses of the first signal train. In response to each pulse of the first signal train, switch 163 is closed momentarily to energize the digit step switch coil 158. Each such actuation of coil 158 moves the wiper arms 183, 184 and 185 one step in a counter-clockwise direction. Thus, if the #1 selector button 42 was that depressed to institute these signals, the wiper arms 183, 184 and 185 would thereby be disposed in engagement, respectively, with the #1, #21 and #41 selector coil contacts 186, the resulting first signal train then comprising three pulses.

Following the above-described operation of the receiver in response to the first signal train, the previously described spacing between the #22 contact 99 (Fig. 17) and the first effective contact 101, if any of the latter are effective by virtue of one or both of the page switches 83, 84 being closed, results in a longer interval which causes de-energization of the No. 1 time delay relay coil 164. As noted, this interval between the first and second signal trains is in the nature of ⅕ of a second, which is sufficient to result in the No. 1 time delay relay letting go. This includes the return of switch 165 to its condition of Fig. 18. At this instant, the No. 2 time delay relay coil 166 is still holding because of its energization through switch 165 until the instant the latter is so returned to its position of Fig. 18, so that the No. 2 time delay relay switch 167 is still closed which causes the transfer relay coil 171 to be energized. The immediate result of energization of coil 171 is the actuation of its associated switches 172, 173, 174 and 175. This movement of switch 173 from its position of Fig. 18 maintains the transfer relay coil 171 energized to lock in the transfer relay. The design of these several parts is such, however, that the release of the No. 2 time delay relay in response to release of the No. 1 time delay relay results in opening of the No. 2 time delay relay switch 169 prior to the above-described closing of transfer relay switch 175, so that the reset relay coil 176 is not thereby energized. This operation of the transfer relay coil automatically conditions the receiver for actuation in response to the following second signal train, if there be any signal pulses therein as a result of page switches 83 and/or 84 being closed. Again, the electrical design of the component parts is such that each signal pulse of the second train, through switches 162 and 172, will temporarily re-energize the No. 2 relay coil 166 sufficiently to maintain the same active until completion of the second signal train. In the meantime, each pulse of the second signal train, through the resulting instantaneous closing of pulse relay switch 163, will energize the level step switch step-up coil 159, through switch 174, to move the wiper arm 177 in a counter-clockwise direction into engagement with the next higher numbered contact 178 of the level step switch. It will be appreciated, of course, that the previous return of No. 1 time delay relay switch 165 to its position of Fig. 18 while No. 2 time delay relay switch 167 was closed and the immediately following actuation of transfer relay switch 173 has energized the level step switch release coil 161. So long as this coil 161 is energized, arms 177, 183, 184 and 185 will remain in any position to which they are moved in response to energizations of coils 158 and 159. The wiper arm 177, of course, will remain in its home position of Fig. 18 if there is no second signal train pulse, it will be moved into engagement with the #1 contact 178 if only one pulse is contained in the second signal train, and if the second signal train comprises two spaced pulses, level step switch arm 177 will be moved into engagement with the #2 contact 178. Regardless of the specific character of the second signal train, the No. 2 time delay relay releases prior to completion of the cycle of operations of the control unit 31. The resulting return of the No. 2 time delay relay switch 169 to its normal closed position, transfer relay switch 175 still being locked closed, will complete an operating circuit from supply line 138 through the level step switch arm 177 and one or the other of the three conductors 179, 181 or 185, and the proper conductor 187, to effect the desired selected machine operation, such as energization of a selector coil of the automatic phonograph 33 corresponding to the selected identifying index 41. At the same time, reset relay coil 176 is energized to open switch 191. This breaks the circuit to transfer relay coil 171.

As previously noted, energization of level step switch release coil 161 enables arms 177, 183, 184 and 185 to be latched in any position to which they are moved. After the above described opening of reset relay switch 191, transfer relay coil 171 holds its switches 172, 173, 174 and 175 momentarily, before releasing to cause their return to the positions of Fig. 18, so that for such moment or short interval, reset relay switch 191 is held open (through switch 175 maintaining the circuit through coil 176), and switch 173 insures continued energization of level step switch release coil 161. As soon as the holding interval of transfer relay coil 171 terminates, its several switches return to their home positions of Fig. 18. This results in de-energization of level step switch release coil 161 to cause return of arms 177, 183, 184 and 185 to their home positions of Fig. 18. It also de-energizes reset relay coil 176 which causes closing of reset relay switch 191. All of the parts are thus returned to their normal positions of Fig. 18 to complete the cycle of operations of the receiver or signal interpreting means during which the proper electrically operable member within the unit being controlled is actuated in response to the previous actuation of the page members 71, 72 to select the desired group of identifying indices 41 and the actuation of the particular push button 42 associated with the selected identifying index within the selected group.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the forms hereinbefore described being merely preferred embodiments thereof.

I claim:

1. In a machine of the class described having a plurality of electrically controllable devices, a plurality of selectively operable manual control members of lesser number than said devices, a plurality of identifying indices each representing one of said devices, index supporting means including page members each mounting a number of said indices respectively aligned with said manual control members, at least one of said page members being selectively movable to superpose the indices thereon over those of another of said page members, whereby any desired one of a plurality of groups of said indices may be selectively exposed in visual alignment with said manual control members; signal means for automatically effecting a multi-train signal having characteristics peculiar to any one of said indices in response to operation of the visually aligned said manual control member, comprising a first signal mechanism operable in response to operation of said manual control members to effect a first signal train having identifying characteristics which are different for each said control member, a second signal mechanism automatically operable in response to operation of said first signal mechanism and in time-spaced relationship thereto to effect a second signal train having identifying characteristics which are different for each said group of indices, and switch members automatically operable in response to selective positioning of said page members for determining the particular group identifying characteristics of said second signal train in accordance with which of said groups is visually exposed; and means for receiving said multi-train signal and automatically interpreting the same to effect operation of that electrically controllable device represented by the particular identifying index visually aligned with the selectively operated manual control member.

2. A machine according to claim 1, in which said receiving means includes pulse-responsive means for receiving spaced pulses comprising said first signal train, a multi-blade switch means having a blade representing each of said groups of indices, means controlled by said pulse-responsive means to actuate said multi-blade switch means, means conditioned by said pulse-responsive means and automatically operable following the last pulse of said first train to render effective only that said blade representing the exposed group of indices, and means automatically operable in time-spaced relationship to said second signal train to energize the proper one of said electrically controllable devices and to re-set said receiving means.

3. In a device of the class described, a plurality of selectively operable manual control members, a plurality of identifying indices of greater number than said control members, index supporting means including page members each mounting a number of said indices respectively aligned with said manual control members, at least one of said page members being selectively movable to superpose the indices thereon over those of another of said page members, whereby any desired one of a plurality of groups of said indices may be selectively exposed in visual alignment with said manual control members, and signal means for automatically effecting a multi-train signal having characteristics peculiar to any one of said indices in response to operation of the visually aligned said manual control member, comprising a first signal mechanism operable in response to operation of said manual control members to effect a first signal train having identifying characteristics which are different for each said control member, a second signal mechanism automatically operable in response to operation of said first signal mechanism and in time-spaced relationship thereto to effect a second signal train having identifying characteristics which are different for each said group of indices, and switch members automatically operable in response to selective positioning of said page members for automatically determining the particular group identifying characteristics of said second signal train in accordance with which of said groups is visually exposed.

4. In a device according to claim 3, full cycle control means operable in response to operation of any one of said control members for maintaining the same in operated position and preventing operation of any other said control member until completion of said multi-train signal by said signal means.

5. A device according to claim 4, in which an electric motor is operable in response to actuation of any said control member to cyclically operate said signal mechanisms and said full cycle control means.

6. In a device of the class described, a plurality of selectively operable manual control members, a plurality of identifying indices of greater number than said control members, index supporting means including page members each mounting a number of said indices respectively aligned with said manual control members, at least one of said page members being selectively movable to superpose the indices thereon over those of another of said page members, whereby any desired one of a plurality of groups of said indices may be selectively exposed in visual alignment with said manual control members, and signal means for automatically effecting a multi-train signal having characteristics peculiar to any one of said indices in response to operation of the visually aligned said manual control member including switch members automatically operable in response to selective positioning of said page members, said index supporting means being removable as a unit from said device to facilitate selective changing of said indices.

7. A device according to claim 6, in which said page members are provided with slideways for respectively receiving a paper slip of sufficient width to accommodate two of said indices, whereby said device is adapted for use with a phonograph employing disc records and the indices on each said paper slip will identify the two faces of a said record.

8. In a device according to claim 7, means forming a part of said index supporting means for resiliently urging each of said page members to either of two operable positions.

9. In a device of the class described, means for effecting a multi-train signal made up of a first train of a plurality of spaced electrical pulses and a second train of one or more electrical pulses, with susbtantially the same time interval between successive pulses in each said train and a greater time interval between said first and second trains, comprising a first series of contacts spaced successively from each other a certain distance, a continuing second series of contacts similarly spaced from each other, the last of said first series of contacts and the first of said second series of contacts being spaced from each other farther than said certain distance, electrically grounded contact wiper means cyclically engageable successively with the contacts of said first and second series, selectively operable control members, normally closed switch means connected serially with each other and each connected electrically with a said contact of said first series and opened in response to operation of a said control member, a signal line connected to that said switch means which is connected to the said last contact of said first series, normally open and selectively closable switch members connected to said signal line in series with each other and respectively connected to the contacts of said second series, and means for cyclically actuating said wiper means in response to operation of any one of said control members.

10. In a device according to claim 9, full cycle control means operable by said last recited means for maintaining the said operated control member in an operated position and for preventing operation of any other said control member until completion of the first train of the multi-train signal.

11. In a device according to claim 10, a plurality of identifying index members selectively movable relative to said control members and each operable in one position automatically to close a said switch member.

12. Selectively operable control mechanism for automatic phonographs, or the like, comprising a plurality of selectively operable and normally inoperative push buttons, a plurality of identifying indices of greater number than said push buttons, index supporting means including page members each mounting a number of said indices respectively aligned with said push buttons, at least one of said page members being selectively movable to superpose the indices thereon over those of another of said page members, whereby any desired one of a plurality of groups of said indices may be selectively exposed in visual alignment with said push buttons; signal means for automatically effecting a multi-train signal having characteristics peculiar to any one of said indices in response to operation of the visually aligned said push button, comprising a first signal mechanism operable in response to operation of said push buttons to effect a first signal train having identifying characteristics which are different for each said push button, a second signal mechanism automatically operable in response to operation of said first signal mechanism and in time-spaced relationship thereto to effect a second signal train having identifying characteristics which are different for each said group of indices, and switch members automatically operable in response to selective positioning of said page members for automatically determining the particular group identifying characteristics of said second signal train in accordance with which of said groups is visually exposed; coin controlled mechanism for rendering said push buttons operative in response to coin deposit, and full cycle control means, comprising locking mechanism operatively associated with all of said push buttons and movable, in response to deposit of a coin in said coin controlled mechanism, from a first normally inoperative position to a second operable position for latching any said push button in depressed position, and automatic control mechanism operable in response to operation of said signal means to cause said locking mechanism to move to a third position for locking the depressed push button in depressed position and blocking all of the other said push buttons against depression and operable to release all of said push buttons automatically following operation of said first signal mechanism and without regard to operation of said second signal mechanism.

References Cited in the file of this patent

UNITED STATES PATENTS

| | | |
|---|---|---|
| 2,382,487 | Kenney | Aug. 14, 1945 |
| 2,382,488 | Kenney | Aug. 14, 1945 |
| 2,411,612 | Boyajian | Nov. 26, 1946 |
| 2,425,974 | Winkler | Aug. 19, 1947 |
| 2,489,782 | Jensen | Nov. 29, 1949 |
| 2,551,522 | Andres | May 1, 1951 |
| 2,612,710 | Fuller | Oct. 7, 1952 |
| 2,622,144 | Jensen | Dec. 16, 1952 |
| 2,624,795 | Bodoh | Jan. 6, 1953 |